United States Patent Office 2,783,273
Patented Feb. 26, 1957

2,783,273

SULFONATION OF PETROLEUM OILS

Guy M. Verley, Harvey, Ill., assignor to Sinclair Refining Company, New York, N. Y., a corporation of Maine No Drawing. Application July 1, 1952,
Serial No. 296,709

2 Claims. (Cl. 260—504)

My invention relates to the production of petroleum sulfonates and in particular relates to a method for sulfonating petroleum oils with sulfur trioxide. Petroleum sulfonates have a wide range of uses, for example, they may be used as synthetic detergents which are used as substitutes for soap and have particular value as blending agents for lubricating oils in which they act as detergents and corrosion inhibitors.

Petroleum sulfonates may be prepared by contacting a petroleum oil with oleum and converting the resulting acid oil to sulfonates. However, petroleum sulfonates produced by this process are of only fair quality and are obtained in only moderate yields due to large amounts of sludge formed in the acid contacting step. The sludge contains sulfonic acids which, however, are in an unusable form in the sludge and therefore these valuable acids are lost with the discarded sludge. A further disadvantage of the formation of large amounts of sludge is that the sludge is difficult to separate and a substantially sludge-free acid oil is required to produce good quality sulfonates. Petroleum sulfonates may also be produced by contacting a petroleum oil with sulfur trioxide and converting the resulting acid oil to sulfonates. This method produces somewhat higher yields than are obtainable with oleum because the volume of sludge is materially reduced and therefore less of the usable sulfonic acids are lost. However, sulfonation of petroleum oils with sulfur trioxide presents difficulties in that sulfur trioxide reacts violently and often forms a very stiff sludge causing sulfonic acid losses and complicating the operation.

I have found that when petroleum oils are sulfonated with sulfur trioxide in the presence of a chlorinated hydrocarbon solvent unexpectedly high yields of useful sulfonic acids are produced and when the resulting acid oil is converted to sulfonates unexpectedly high yields of sulfonates of surprisingly high concentration are produced. Sludge losses are correspondingly reduced. According to my invention, the oil feed and the chlorinated solvent are contacted with sulfur trioxide in a reaction zone at a temperature of about 30° to 90° F. The solvent is removed by distillation and the sludge or oil insoluble material produced in the reaction is precipitated. The recovered acid oil may then be converted to sulfonates.

For example, I dissolve a petroleum oil in about an equal volume of a chlorinated solvent, e. g., ethylene dichloride. The oil solution is moderately agitated and the surface of the oil solution is then contacted with sulfur trioxide vapor so that the oil solution is contacted with about 9 to 15 weight percent of sulfur trioxide based on the oil over a period of about 1 to 3 hours at a temperature of about 30° to 90° F. Other methods of contacting can be employed. For example, a mixture of the oil feed and the chlorinated solvent, either preformed or formed by concurrent introduction to the reaction zone, may be contacted with sulfur trioxide in a tower type reaction zone in continuous fashion. The chlorinated solvent is removed as by distillation whereupon sludge is precipitated and may be removed by settling or centrifuging. To facilitate sludge separation, an equal volume of a hydrocarbon solvent in which the sludge is insoluble may be added to the acid oil. For example, hexane may be added as precipitant to the mixture which is then settled and the sludge is withdrawn. The acid oil, which is a substantially sludge-free concentrate of sulfonic acids in petroleum oils, is then converted to a particular sulfonate desired. For example, if a metal sulfonate is desired the acid oil is reacted with a metal oxide or hydroxide to produce the particular metal petroleum sulfonate.

The process of my invention surprisingly produces about four times the effective sulfonate yield of a conventional oleum process and about three times that of a conventional sulfur trioxide process using no solvent. By effective yield, I mean the percent yield of sulfonates multiplied by the percent of the combining element in the sulfonate, for example, percent barium in barium sulfonate. When ethylene dichloride is used, for example, this high effective yield is obtained while the consumption of sulfur is reduced to about one tenth as much as that of the conventional oleum process and about one third as much as the conventional sulfur trioxide process in producing a given amount of sulfonates. The production of undesirable sludge is reduced to about one fourteenth as much as the oleum process and about one fourth as much as the conventional sulfur trioxide process in producing a given amount of sulfonates. In addition to these advantages, the process of my invention produces a sulfonate of surprisingly high concentration, for example, a barium sulfonate containing about 10 percent barium when ethylene dichloride is used, which substantially reduces the cost of handling, shipping, and storage and when used as a lubricating oil additive, reduces the cost of blending and the amount of higher viscosity oils used in the blending. In conventional processes, less concentrated sulfonates are produced which must be concentrated before they can be used as lubricating oil additives. If not concentrated, it may be necessary to add higher viscosity oils to prevent changes in the viscosity of the lubricating oil. Moreover, unconcentrated sulfonates are expensive to store in terms of storage costs per pound of sulfonates. Thus, the process of my invention provides an effective method of producing superior yields of petroleum sulfonic acids and petroleum sulfonates of surprisingly high concentration and good quality while effecting substantial cost savings in terms of materials used and operational costs.

The petroleum oil useful in the process of my invention is a viscous petroleum stock, advantageously a lubricating oil fraction such as a neutral oil of a viscosity of about 100 to 300 S. S. U. at 100° F. However, oils ranging from heavy gas oils to bright stocks in general are useful. The sulfur trioxide employed in my invention is gaseous sulfur trioxide or may be a stabilized sulfur trioxide, for example, the commercially available sulfur trioxide known as "Sulfan" which is in liquid form. The sulfur trioxide may contain a diluent gas, for example, air, nitrogen or oxygen.

I have found that the temperature range required for efficient reaction is between about 30° to 90° F. Temperatures of about 80° to 90° F. produce the highest yields and are preferred. I have further found that proportions of about 9 to 15 weight percent sulfur trioxide based on the oil stock produce the highest yield of sulfonates and a proportion of about 12.5 percent is preferred. The time of addition may vary from as much as about 1 to 3 hours for batch contacting to several minutes for efficient countercurrent contacting systems.

The solvent employed in the process of my invention is a chlorinated hydrocarbon solvent containing not more than two carbon atoms, advantageously ethylene dichloride. Other chlorinated solvents such as chloroform and carbon tetrachloride are also useful. Solvent to oil ratios of about 0.5 to 2:1 are useful but a solvent to oil ratio of about 1:1 is preferred as this seems to produce the highest yield. I have also found that a smaller amount of solvent has an undesirable effect upon the filtration rate of the sulfonates produced. For example, barium sulfonate made from acid oil produced by using a solvent to oil ratio of 0.5:1 filters very slowly.

As the chlorinated solvents partially dissolve the sludge, they must be removed from the reaction mixture in order to separate the sludge. This is advantageously done by distilling off and recovering the chlorinated solvent for reuse. As noted above, sludge separation may be provided, if desired, by means of a hydrocarbon precipitant, e. g., butane, hexane or naphtha. Usually, this is unnecessary in large scale operations. The sludge is removed by settling or centrifuging.

The acid oil then may be converted to a particular sulfonate desired. For example, barium sulfonates are produced by adding the acid oil to a hot slurry of barium oxide or hydroxide in an equal amount of water and filtering the reaction product after dehydration at an elevated temperature, for example, about 300° F. The yield of barium sulfonates is very high, e. g., about 100 percent. The product contains about 7 to 10 percent barium and is of good quality.

The process of my invention will be further illustrated by reference to the following examples.

Example I

A petroleum oil of the following characteristics was used for the sulfonation stock: API gravity 28.1, viscosity of 224.3 S. S. U. at 100° F. and 47 S. S. U. at 210° F. and specific dispersion (g-e) 117. A mixture of 1000 grams of the sulfonation stock and 1133 milliliters of ethylene dichloride solvent was placed in a 3-1, three-necked flask fitted with a stirrer, gas inlet tube, and a vent. Another flask, containing 125 grams (12.5 percent by weight) of "Sulfan" (a commercially available stabilized sulfur trioxide), was connected to the main reaction vessel through the gas inlet tube. After the reaction mixture was brought to 80° to 85° F. by means of a water bath, the flask containing the "Sulfan" was heated. The sulfur trioxide vapors entered the reaction vessel and filled the upper part of the flask. The "Sulfan" was added, with stirring, over a period of 3.5 hours. The reaction mixture was allowed to come to room temperature and stand overnight. The ethylene dichloride was removed by distilling at 80° F. under 7-8 mm. pressure. Hexane (1000 milliliters) was added and after standing overnight 209 grams of sludge were removed. The hexane solution had an acid number of 23.6. The hexane solution was neutralized by adding it to a slurry of 172 grams (300 percent theoretical) barium oxide in 344 milliliters of H2O. After the hexane and water were distilled off and after filtration, 1009 grams of barium sulfonates were obtained.

The sulfonate yield (percent on charge) was 100.9 weight percent containing 9.58 weight percent barium. The base number was 14.2, the gravity was 7.6 and the sulfonate had an o. d. color of 965.

Example II

Additional tests were made to determine the effect of carbon tetrachloride and chloroform upon the yield and quality of the sulfonate produced. The oil stock, procedure and conditions were that of Example I and the product was barium sulfonate.

Also included, for comparative purposes, are the results of a commercial oleum process, a sulfur trioxide process using no solvent and the ethylene chloride process of Example I. In the oleum process, the oil stock (of Example I) was treated with 3 dumps of 22 percent oleum at a temperature of 110-135° F. In the sulfur trioxide-no solvent process, the oil stock (of Example I) was treated at 50°-57° F. by the procedure of Example I.

The results were:

|  | Oleum | SO₃ No Solvent | SO₃ Carbon Tetra-Chloride | SO₃ Chloroform | SO₃ Ethylene Chloride |
|---|---|---|---|---|---|
| Oleum Dosage, Wt. percent of Oil | 27 | | | | |
| SO₃ Dosage, Wt. percent of Oil | | 12.5 | 12.5 | 12.5 | 12.5 |
| Sulfur Equivalent | 9.2 | 5 | 5 | 5 | 5 |
| Relative Sulfur Equivalent¹ | 4.4 | 1.7 | 0.8 | 0.7 | 0.5 |
| Sludge: Yield, Wt. percent of Oil | 62 | 33 | 27 | 24 | 21 |
| Relative Yield² | 28 | 11 | 4 | 3 | 2 |
| Barium Sulfonate: Yield, Wt. percent of Oil | 67 | 85 | 86.3 | 95.3 | 100.9 |
| Percent Ba | 3.12 | 3.53 | 7.11 | 7.60 | 9.58 |
| Effective Yield³ | 2.13 | 3.0 | 6.15 | 7.26 | 9.66 |
| Blend Color | | 4− | 4− | 3½+ | 4½− |

¹ Relative sulfur equivalent=sulfur equivalent divided by effective yield. This represents amount sulfur required to produce given amount of sulfonates.
² Relative sludge yield=sludge yield divided by effective yield.
³ Effective yield=yield barium sulfonate×percent Ba.

The results show that the average effective yield obtained by using chlorinated solvents was from about 3 to 4 times that of the effective yield of the conventional oleum process or of a sulfur trioxide process using no solvent. The quality of the sulfonate was good.

The unexpectedly high effective yields were obtained by using chlorinated solvents while the consumption of sulfur was reduced to an average of about one seventh as much as that of the oleum process and only about one third as much as the sulfur trioxide-no solvent process in producing a given amount of sulfonates. Moreover, an average of only about one tenth as much sludge was produced as in the oleum process and only about one fourth as much as in the sulfur trioxide-no solvent process in producing a given amount of sulfonates.

The sulfonate was of unexpectedly high concentration, e. g., 9.58 percent barium in the ethylene dichloride sample as compared to only 3.12 and 3.53 percent barium in the conventional oleum and sulfur trioxide-no solvent processes.

The high effective yields of good quality sulfonates of high concentration and the corresponding reductions in amount of sulfur required and sludge produced clearly indicate the advantages of my invention.

I claim:

1. In the sulfonation of petroleum oils having a viscosity of about 100 to 300 SSU at 100° F., the method which comprises contacting the oil feed and a chlorinated hydrocarbon solvent containing not more than two carbon atoms with a sulfonating agent which consists essentially of sulfur trioxide at a temperature of about 30° to 90° F., removing the chlorinated solvent from the reaction mixture by distillation, separating oil-insoluble sludge and recovering the sulfonated oil.

2. The process of claim 1 in which the chlorinated hydrocarbon solvent is ethylene dichloride.

(References on following page)

References Cited in the file of this patent

UNITED STATES PATENTS

| | | |
|---|---|---|
| 1,785,270 | Lavirotte | Dec. 16, 1930 |
| 1,835,404 | Kalischer et al. | Dec. 8, 1931 |
| 2,205,924 | Frame | June 25, 1940 |
| 2,231,979 | Wolter | Feb. 18, 1941 |
| 2,358,774 | Blumer | Sept. 26, 1944 |
| 2,514,733 | Vold et al. | July 11, 1950 |
| 2,523,582 | Mattison | Sept. 26, 1950 |
| 2,616,936 | Mammen et al. | Nov. 4, 1952 |
| 2,691,040 | Bloch et al. | Oct. 5, 1954 |